United States Patent [19]
Lewis

[11] 3,830,519
[45] Aug. 20, 1974

[54] FIBER REINFORCED INFLATABLE RESTRAINING BAND FOR VEHICLES

[75] Inventor: Donald Joseph Lewis, Troy, Mich.

[73] Assignee: Allied Chemical Corporation, Morristown, N.J.

[22] Filed: Jan. 10, 1973

[21] Appl. No.: 322,594

[52] U.S. Cl............... 280/150 AB, 5/348 R, 9/314, 138/123, 206/DIG. 30, 280/150 SB
[51] Int. Cl........................................... B60n 21/08
[58] Field of Search................ 280/150 AB, 150 SB; 9/340–346, 314–327, 329; 138/123; 139/387 R, 388, 389; 206/DIG. 30; 128/DIG. 20; 5/348; 297/384, 385

[56] References Cited
UNITED STATES PATENTS

| | | | |
|---|---|---|---|
| 1,856,632 | 5/1932 | Haines | 9/340 |
| 2,096,835 | 10/1937 | Amyot | 139/387 R |
| 2,176,754 | 10/1939 | Wolfson | 139/387 R |
| 2,703,891 | 3/1955 | Mayer | 9/340 |
| 3,322,163 | 5/1967 | Hughes | 297/385 |
| 3,414,920 | 12/1968 | Beaton | 9/316 |
| 3,682,498 | 8/1972 | Rutzki | 280/150 SB |
| 3,706,462 | 12/1972 | Lilly | 280/150 AB |
| 3,730,551 | 5/1973 | Sack et al. | 138/420 R |
| 3,756,620 | 9/1973 | Radke | 280/150 AB |

FOREIGN PATENTS OR APPLICATIONS 882,364  11/1961  Great Britain.................. 138/123

Primary Examiner—David Schonberg
Assistant Examiner—John P. Silverstrim
Attorney, Agent, or Firm—Jonathan Plaut

[57] ABSTRACT

An inflatable restraining band for vehicle safety systems which is formed from an extruded seamless plastic tube having fiber reinforcement extending longitudinally thereof.

5 Claims, 4 Drawing Figures

PATENTED AUG 20 1974    3,830,519
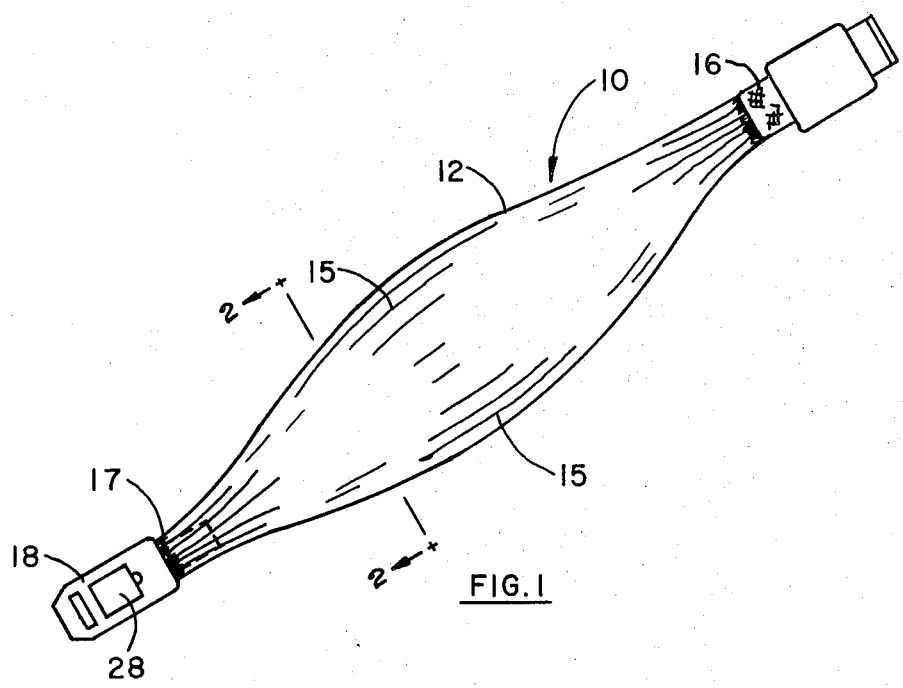
FIG. 1
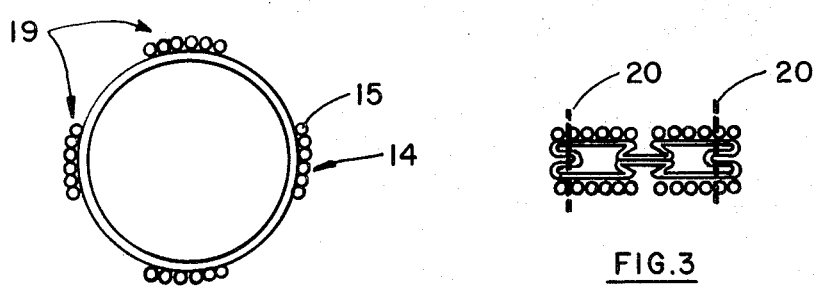
FIG. 2
FIG. 3
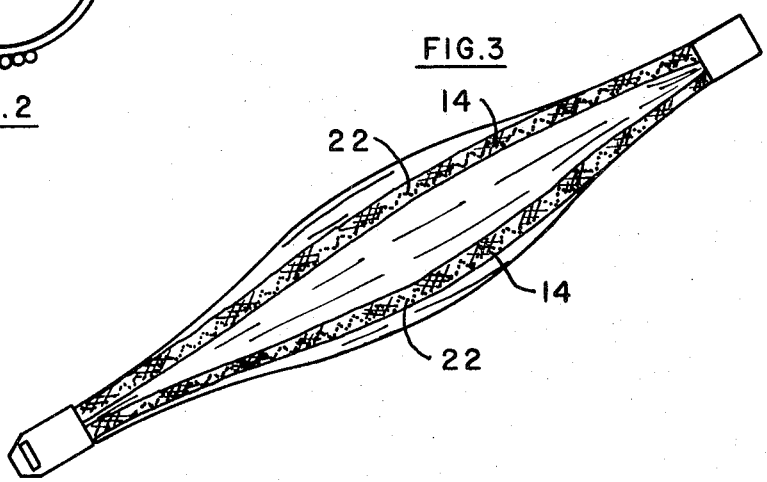
FIG. 4

… …

3,830,519

FIBER REINFORCED INFLATABLE RESTRAINING BAND FOR VEHICLES

FIELD OF THE INVENTION

This invention relates to safety devices for vehicle occupants, more particularly to inflatable restraining band safety devices.

DESCRIPTION OF THE PRIOR ART

Seat belt devices to secure vehicular occupants in their seats in general use today usually include two sections of seat belt webbing, each of which has one end mounted to the vehicle with the other ends attached to a buckle and a cooperating tongue. Such seat belts are designed to restrain an occupant in his seat during a collision by limiting the forward motion of the occupant with respect to his seat as a result of the collision. That is, the wearer moves forward and impacts against the seat belt webbing which thereafter restrains him against further forward motion.

Safety devices of the air bag type have been proposed in which an inflatable air bag is mounted in the interior of the vehicle and is inflated in response to a sensing device which is actuated by a collision of the vehicle. Air bags are designed to prevent the occupant from striking the vehicle structure and operate by cushioning the forward motion of the occupant during a collision.

It is been proposed to combine the two types of safety devices mentioned above as, for example, in U.S. Pat. No. 3,682,498 to Rutski, and my copending application Ser. No. 290,917 entitled "Vehicle Safety System" filed on Sept. 21, 1972 which application is hereby incorporated herein as reference.

SUMMARY OF THE INVENTION

In accordance with this invention, an improved vehicle safety system is provided which comprises an inflatable restraining means comprising an extruded tubular inflatable member containing fiber reinforcement, and means for inflating said member.

More particularly, an inflatable restraint is provided in which the inflatable portion thereof is made from extruded tubular plastic sheet member containing fiber reinforcement extending generally parallel to the longitudinal axis of the tubular sheet member.

BRIEF DESCRIPTION OF THE DRAWINGS

FIG. 1 is a perspective view of one embodiment of the inflatable restraint of this invention.

FIG. 2 is a sectional view taken along line 2—2 of FIG. 1 with the restraint in its inflated posture.

FIG. 3 is a sectional view similar to FIG. 2 with the restraint in its folded posture.

FIG. 4 is an alternate embodiment of the inflatable restraint of this invention.

In accordance with a preferred embodiment of this invention, an inflatable band restraint 10 is provided which is formed from an inflatable extruded plastic tube 12 having fiber reinforcement 14 extending longitudinally thereof. The tube 12 is adapted to be inflated prior to any substantial forward motion of the wearer with respect to his seat as a result of a collision of the vehicle or other predetermined condition which is sensed by a sensing means. The longitudinally extending fiber reinforcement 14 is adapted to provide resistance to significant distortion of the tube 12 due to the force of the inflating air inside and the force of the wearer's body against the band.

DESCRIPTION OF THE PREFERRED EMBODIMENT

Referring to the drawings wherein same reference numerals refer to same or like parts, an inflatable band restraining means 10 include inflatable tube section 12 connected to terminal webbing 16, 17 which in turn are connected to a buckle 18, clasp, or the like for securing the belt around the occupant to the vehicle.

Inflatable section 12 is preferably formed of a generally tubular sleeve of extruded plastic and is normally rolled, folded, or otherwise maintained in the uninflated position. Preferably, the restraint 10 is folded to provide a seemingly flat seat belt section as shown in FIG. 3, and the folds are maintained in the tube by suitable fastening means, such as frangible stitches 20, by glueing or the like.

In a preferred embodiment, inflatable section 12 is formed from an extruded plastic tube and has a series of filament yarns 15 extending parallel to one another along the longitudinal axis thereof.

The fiber may be any fiber which is compatible with the extruded plastic such as nylon filament, polyester filament, cotton, rayon, etc., and may be in the form of monofilament, filament yarn or staple yarn. Alternatively, the reinforcing fibers 14 may be in the form of fabric or webbing 22 secured to inflatable section 12.

The fiber reinforcement 14 is also preferably arranged in groups 19 around the circumference of section 12 and extends substantially from one end to another. Such grouping can either be accomplished by arranging longitudinal filaments 15 in rows as shown in FIGS. 1–3 or by adhering webbing 22 extending generally parallel to the longitudinal axis of expandable section 12 as shown in FIG. 4. Webbing 22 preferably has fiber elements running generally longitudinally thereof in a direction generally parallel to the axis of inflatable section 12.

As can be seen from FIG. 3, the fibers preferably and advantageously are arranged in groups around the circumference of expandable section 12, such that when section 12 is folded into its uninflated position substantially all of the fiber reinforcement is on the face of the folded belt and substantially none is folded beneath the face. In such condition, the fibers provide a facing and section 12 presents the appearance of a fibrous belt when in its folded condition, thus providing a more aesthetic inflatable band as well as one with enhanced resistance to distortion. The same effect can be gained with a series of webs 22 spaced around the circumference of section 12.

The filament yarn 15 or webbing 22 can be adhered to expandable section 12 by lamination onto a preformed tube or between two preformed tubes or by adhering them to the tubular sleeve or sleeves during the extrusion process.

The expandable section 12 may be formed from any plastic material by such processes as extrusion, etc. using materials such as nylon, polyester, polyethylene, polypropylene, rubber, etc., alone or in combination with one another or other materials.

It is desired that inflatable section 12 be substantially non-porous, that is, gas impermeable, so that when inflated with a gas it retains its inflated state by substantially preventing escape of the gas. In certain instances, it may be desired to provide section 12 with a desired degree of porosity such as by providing apertures therein.

Inflating mechanism 28 may be located at the buckle tongue 18 and connected to the inflatable band interior 12 by conventional means. Alternatively, the inflating mechanism may be in communication with inflatable portion 12 adjacent the terminal webbing 16, 17.

Inasmuch as buckles and retractors used with restraints of the seat belt type are well known in the art and may be of a variety of designs, they are not specifically described herein.

Inflating means 28 is selected to inflate the inflatable band in a very short time after actuation thereof by a sensing means, by introducing gas into the inflatable section 12.

Examples of suitable sensing devices are those shown in U.S. Pat. No. 3,668,063 to Bell. Such sensing means are responsive to a condition of the vehicle, most preferably a collision thereof, rather than being responsive to the movement of the wearer into the restraint. As a result, the vehicle safety system thereof is capable of restraining the wearer prior to his moving with respect to his seat as a result of a collision.

The inflating means 28 include a gas source which may be of the gas generating type (activated by means of a pyrotechnic device, for example) or stored gas type or a combination of both. As these gas sources also are known in the art, particularly with respect to proposed air bag restraint systems, they are not specifically described herein.

In operation, unitary inflatable restraint 10, either for chest restraint alone, or including both chest and lap restraining sections as is well known and as described, for example, in U.S. application Ser. No. 307,703 filed Nov. 17, 1972 of Robert Stephenson entitled "Slip Tongue with Inflator Band," is secured about the body of the wearer. When a collision or other preselected condition of the vehicle occurs, sensing means senses the same and immediately signals and actuates inflating means 28 which thereupon introduces a gas into the inflatable portion 12. The force of the gas introduced into and expanding within inflatable section 12 is sufficient to break the stitches 20 which normally hold inflatable section 12 in its uninflated state, and inflate this section. The fiber reinforcement 14 on inflatable section 12 provides reinforcement and longitudinal strength characteristics of expandable section 12 due to the expanding force of the gas inside coupled with the stretching effect caused by the vehicle occupant being thrust against the restraint.

While exemplary embodiments of the invention have been described, the true scope of the invention is to be determined from the following claims.

I claim:

1. An inflatable restraint means for a vehicle safety system which when folded and uninflated functions as a seat belt comprising an extruded tubular inflatable member folded in its uninflated condition and containing a plurality of fibers arranged around the circumference thereof extending in a direction generally parallel to the longitudinal axis of the tubular member, and providing reinforcement therefor, and means for inflating said member.

2. The restraint means of claim 1, said fibers being arranged in a plurality of groups of fibers arranged whereby said groups provide the facing for said member when it is in its folded condition.

3. The restraining means of claim 1 wherein the fiber reinforcement comprises a series of webbing spaced around the circumference of said tubular member whereby said webbing provides the facing for said member in its folded condition.

4. The restraining means of claim 1 wherein the fiber reinforcement comprises nylon.

5. The restraining means of claim 1 wherein the fiber reinforcement comprises polyester.

* * * * *